US005889665A

United States Patent [19]

Han

[11] Patent Number: 5,889,665

[45] Date of Patent: Mar. 30, 1999

[54] ANALOGUE MULTIPLIER USING MOSFETS IN NONSATURATION REGION AND CURRENT MIRROR

[75] Inventor: Il Song Han, Seoul, Rep. of Korea

[73] Assignee: Korea Telecom, Seoul, Rep. of Korea

[21] Appl. No.: 940,007

[22] Filed: Sep. 29, 1997

[30] Foreign Application Priority Data

Oct. 1, 1996 [KR] Rep. of Korea .................. 1996 43563

[51] Int. Cl.[6] .............................. H02M 3/18; G05F 3/16; G06F 1/04

[52] U.S. Cl. ............................ 363/60; 323/313; 323/314; 323/315; 327/296

[58] Field of Search ............................... 363/60; 323/313, 323/314, 315, 316, 317; 327/296, 201, 522

[56] References Cited

U.S. PATENT DOCUMENTS 5,034,626 7/1991 Pirez et al. .............................. 307/296

5,521,544 5/1996 Hatanaka ................................ 323/315

*Primary Examiner*—Peter S. Wong

*Assistant Examiner*—Rajnikant B. Patel

*Attorney, Agent, or Firm*—Staas & Halsey

[57] ABSTRACT

A multiplier capable of removing nonlinear current using current mirror circuits. The multiplier uses MOSFET and BJT devices by the BiCOMS processes. The multiplier includes three current mirror circuits. A first current mirror includes a BJT $Q_3$ and a BJT $Q_5$ and also the BJT $Q_3$ is coupled in series to the n-channel MOSFET M1 between the voltage $V_1$ and a ground voltage level. A second current mirror includes a BJT $Q_7$ and a BJT $Q_8$. A third current mirror includes a BJT $Q_4$ and a BJT $Q_6$. Consequently, input voltage signals $V_1$ and $V_{dc}$ applied to the n-channel MOSFETs M1 determine the current $I_1$ and input voltage signals $V_1$ and $V_2$ applied to the n-channel MOSFET M2 determine the current $I_2$.

12 Claims, 1 Drawing Sheet

ANALOGUE MULTIPLIER USING MOSFETS IN NONSATURATION REGION AND CURRENT MIRROR

BACKGROUND OF THE INVENTION

1. Field of the Invention

The present invention relates to a Multiplier using MOSFETs operating in a nonsaturation region, and more particularly to a multiplier capable of removing nonlinear current using current mirror circuits.

2. Description of the Related Art

Recently, with the development of the VLSI technology, it is required that an analogue system be integrated with a digital system. The reason why the digital system is integrated with the analogue system is because the digital technology is employed not only in a specific use, such as a computer system, but also in various scopes such as telecommunications and neural networks.

On the other hand, in the conventional analogue multipliers, it is difficult to obtain exact results of multiplication and also they are subject to restriction in their dynamic characteristics. The different complementary circuits, which are added to the multipliers for solving the above problems, may be subject to another restriction. Typical restriction may be issued in speed, integration and complexity. In particular, the conventional analogue multipliers are subject to restriction in high-frequency band, such as video signals, due to the use of symmetrical polarity signals and operational amplifiers.

SUMMARY OF THE INVENTION

It is an object of the present invention to provide a high performance multiplier using MOSFETs of which the nonlinear characteristics are removed by a current mirror.

It is another object of the present invention to provide a high speed multiplier capable of cutting down its manufacturing cost, by excluding the use of an amplifier.

It is further another object of the present invention to provide a high performance multiplier capable of being fabricated by the BiCOMS processes, In accordance with an aspect to the present invention, there is provided a multiplier producing a first current and a second current and then outputting a linear output current by subtracting a second current from said first current, said multiplier comprising: first input means having a first MOS transistor which produces said first current in response to a first input voltage wherein the first MOS transmitter operates in a nonsaturation region; a first current mirror including a plurality of bipolar transistors to generate a third current, being coupled to said first MOS transistor; a second current mirror including a plurality of bipolar transistors to generate said first current which is not out of phase with said third current, wherein said first current mirror is coupled to said second current mirror; second input means having a second MOS transistor which produces said second current in response to a second input voltage, wherein the second MOS transistor operates in a nonsaturation region and a third current mirror including a plurality of bipolar transistors to generate said second current, being coupled to the second MOS transistor, wherein said third current mirror is coupled in parallel to said first current mirror.

In accordance with another aspect to the present invention, there is provided a multiplier producing a first current and a second current and then outputting a linear output current by subtracting a second current from said first current, said multiplier comprising: first input means having a first MOS transistor which produces said first current in response to a first input voltage wherein the first MOS transistor operates in a nonsaturation region; a first current mirror including a plurality of bipolar transistors to generate a third current, being coupled to said first MOS transistor; a second current mirror including a plurality of bipolar transistors, being coupled to second MOS transistor, wherein said second current mirror is coupled in parallel to said first current mirror; second input means having a second MOS transistor which produces said second current in response to a second input voltage, wherein the second MOS transistor operates in a nonsaturation region; a third current mirror including a plurality of bipolar transistors to generate said second current, being coupled to the second MOS transistor, wherein said third current mirror is coupled in parallel to said first current mirror, and a switching means formed an output terminal for determining an amount of said output current in response to a switching timing.

BRIEF DESCRIPTION OF THE DRAWINGS

The novel features believed characteristic of the invention, as well as other features and advantages thereof, will best be understood by reference to the following detailed description of a particular embodiment, read in conjunction with the accompanying drawings, wherein.

DETAILED DESCRIPTION OF PREFERRED EMBODIMENTS

Figure 1:
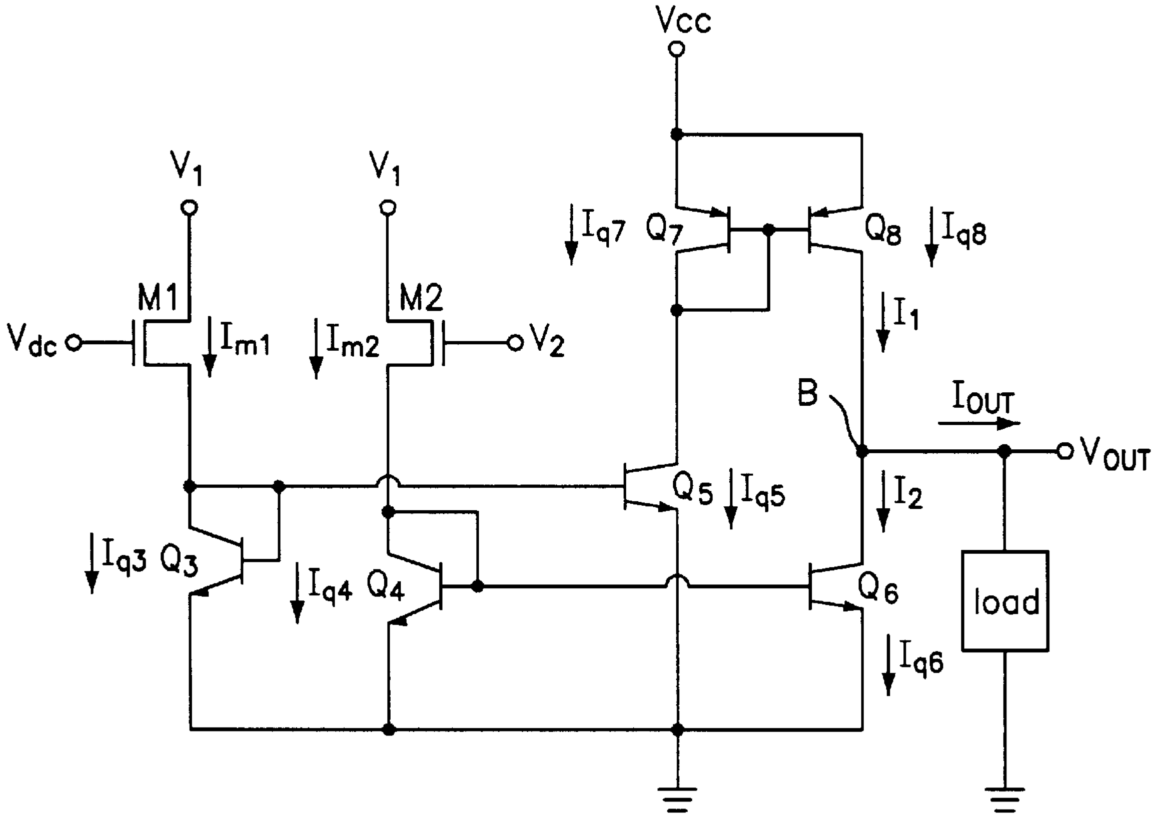
FIG. 1 is a circuit diagram illustrating a multiplier according to an embodiment of the present invention.

A preferred embodiment of the present invention will be 20 described in detail with reference to FIG. 1.

In general, the MOSFETS' current-voltage characteristics in the nonsaturation region (triode region) are given by $$I_{ds}=\alpha[(V_{gs}-V_t)*V_{ds}-V_{ds}^2/2] \quad (1)$$

$$\alpha=(C_{ox}w\mu)/L$$

where $I_{ds}$ is known as the current between the source and the drain, $V_{gs}$ the voltage between the gate and the source, $V_{ds}$ the voltage between the drain and the source, $C_{ox}$ the gate oxide capacitance per unit area, L the length of the channel, W the width of the channel (along an axis normal to L), $\mu$ the mobility of the majority carrier and $V_t$ the threshold voltage.

According to Equation (1), when n-channel MOSFETs M1 and M2 operate in the nonsaturation region, a current $I_{m1}$ at the n-channel MOSFETs M1 and a current $I_{M2}$ at the n-channel MOSFETS M2 are respectively given by $$I_{m1}=\alpha*[(V_{dc}-V_t)*V_1-V_1^2/2] \quad (2)$$

$$I_{m2}=\alpha*[(V_2V_t)*V_1-V_1^2/2] \quad (3)$$

The difference between the current $I_{m1}$ and the current $I_{m2}$ is given by $$I_{m1}-I_{m2}=\alpha*V_2*V_1-\beta(\beta \text{ is an offset term}) \quad (4)$$

As shown in Equation (4), the difference between the current $I_{m1}$ and the current $I_{m2}$ is determined by the multiplication of $V_2$ and $V_1$. That is, the circuit, as shown in FIG. 1, is used as a multiplier. Also, the present invention employs current mirrors to obtain an output current $I_o|=I_1I_2|$. If the amount of the current $I_1$ is the same as that of the current $I_{m1}$ and the amount of the current $I_2$ is the same as that of the current $I_{m2}$, the Equation (4) is rewritten as $$I_o=I_{m1}-I_{m2}=I_1-I_2 \quad (5)$$

Referring now to FIG. 1, the multiplier according to the present invention uses MOSFET and BJT devices by the BiCOMS processes. The multiplier includes three current mirror circuits. A first current mirror includes a BJT $Q_3$ and a BJT $Q_5$ and also the BJT $Q_3$ is coupled in series to the n-channel MOSFET M1 between the voltage $V_1$ and a ground voltage level. A second current mirror includes a BJT $Q_7$ and a BJT $Q_8$. A third current mirror includes a BJT $Q_4$ and a BJT $Q_6$.

The current $I_{m1}$ at the n-channel MOSFET M1 is equal to a current $I_{q3}$ at the BJT $Q_3$ because the n-channel MOSFET M1 is coupled in series to the BJT $Q_3$, forming one current path. Also, because the BJTs $Q_3$ and $Q_5$ construct the first current mirror, a current $I_{q5}$ at the BJT $Q_5$ is equal to the current $I_{q3}$ at the BJT $Q_3$. Further, because the BJTs $Q_7$ and $Q_8$ construct the second current mirror and the BJT $Q_7$ is coupled in series to the BJT $Q_5$ on the same current path, a current $I_{q7}$ is equal to the current $I_{q5}$ and a current $I_{q8}$ ($I_1$) at the BJT $Q_8$. As a result, the current $I_1$ is equal to the current $I_{m1}$ by virtue of the first and second current mirrors. However, the output of the second current mirror is out of phase from the first current mirror so that the nonlinear component of the output current $I_{out}$ is eliminated.

Further, the current $I_{m2}$ at the n-channel MOSFET M2 is equal to a current $I_{q4}$ at the BJT $Q_4$. Also, because the BJTs $Q_4$ and $Q_6$ construct the third current mirror, a current $I_{q6}$ (=$_{12}$) is equal to the current $I_{m2}$.

In other words, $$I_{m1}=I_{q3}=I_{q5}=I_{q7}=I_{q8}(=I_1) \text{ (by the first and second current mirrors)} \quad (6)$$

$$I_{m2}=I_{q4}=I_{q6}(=I_2) \text{ (by the third current mirror)} \quad (7)$$

As a result, the output current $I_o$ is given by $$I_o=I_1-I_2=I_{m1}-I_{m2}$$

Consequently, input voltage signals $V_1$ and $V_{dc}$ applied to the n-channel MOSFETs M1 determine the current $I_1$ and input voltage signals $V_1$ and $V_2$ applied to the n-channel MOSFET M2 determine the current $I_2$.

In the case where a switching transistor is used on the output terminal, the multiplication of three variables can be carried out, by controlling the timing thereof. Also, if a plurality of circuits, as shown in FIG. 1, are combined and then their output terminals are combined, it is possible to implement an adder by the wired-OR.

As apparent from the above, the present invention solves the problems inherent in analog multiplication where there is high-difficulty or limitation by providing an epoch-making method in a multiplier implementation which has been essential in the technical field of analog electronics circuit design. That is, by overcoming the prior problems in implementing an ASIC (application specific integrated circuit) through simple circuit design comprised of a few transistors, it is possible that a high-speed analogue operation may be realized in every application field. All numerical value operations can be also accomplished with a low price and a generalized implementation technology since addition operations, as well as any implementation of operation circuit based on multiplication, is available. Further, the present invention has prominent effects in neural computers, high-speed modems, wireless communications and video/audio data processing technology.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A multiplier producing a first current and a second current and then outputting a linear output current by subtracting said second current from said first current, said multiplier comprising:

first input means having a first MOS transistor which produces said first current in response to a first input voltage, wherein the first MOS transistor operates in a nonsaturation region thereof;

a first current mirror including a plurality of bipolar transistors to output a third current, being coupled to said first MOS transistor;

a second current mirror including a plurality of bipolar transistors to output said first current which is out of phase with said third current, wherein said first current mirror is coupled to said second current mirror;

second input means having a second MOS transistor which produces said second current in response to a second input voltage, wherein said second MOS transistor operates in a nonsaturation region thereof; and a third current mirror including a plurality of bipolar transistors to output said second current, being coupled to said second MOS transistor, wherein said third current mirror is coupled in parallel to said first current mirror.

2. The multiplier in accordance with claim 1, wherein said third current mirror comprises:

a first bipolar transistor having a collector and a base, each of which is connected to a source of said second MOS transistor, and an emitter connected to a ground voltage level; and a second bipolar transistor having a base connected to said base of said first bipolar transistor, an emitter connected to said ground voltage level, and a collector connected to said second current mirror.

3. The multiplier in accordance with claim 2, wherein said first current mirror comprises:

a third bipolar transistor having a collector and a base, each of which is connected to a source of said first MOS transistor, and an emitter connected to said ground voltage level; and a fourth bipolar transistor having a base connected to said base of said third bipolar transistor, an emitter connected to said ground voltage level, and a collector connected to said second current mirror.

4. The multiplier in accordance with claim 3, wherein said second current mirror comprises:

a fifth bipolar transistor having a collector and a base, each of which is connected to said collector of said fourth bipolar transistor, and an emitter connected to a predetermined voltage level; and a sixth bipolar transistor having a base connected to said base of said fifth bipolar transistor, a collector connected to said third current mirror and an emitter connected to said predetermined voltage level.

5. The multiplier in accordance with claim 2, wherein said drain and gate of said first MOS transistor are said first input voltage and a fixed voltage, respectively.

6. The multiplier in accordance with claim 2, wherein said drain and gate of said second MOS transistor are said first input voltage and a second input voltage, respectively.

7. A multiplier producing a first current and a second current and then outputting a linear output current by subtracting said second current from said first current, said multiplier comprising:

first input means having a first MOS transistor which produces said first current in response to a first input voltage wherein said first MOS transistor operates in a nonsaturation region thereof;

a first current mirror including a plurality of bipolar transistors to output a third current, being coupled to said first MOS transistor;

a second current mirror including a plurality of bipolar transistors to output said first current which is out of phase with said third current, wherein said first current mirror is coupled to said second current mirror;

second input means having a second MOS transistor which produces said second current in response to a second input voltage, wherein said second MOS transistor operates in a nonsaturation region thereof;

a third current mirror including a plurality of bipolar transistors to output said second current, being coupled to said second MOS transistor, wherein said third current mirror is coupled in parallel to said first current mirror; and switching means formed at an output terminal for determining an amount of said linear output current in response to a switching timing.

8. The multiplier in accordance with claim 7, wherein said third current mirror comprises:

a first bipolar transistor having a collector and a base, each of which is connected to a source of said second MOS transistor, and an emitter connected to a ground voltage level; and a second bipolar transistor having a base connected to said base of said first bipolar transistor, an emitter connected to said ground voltage level, and a collector connected to said second current mirror.

9. The multiplier in accordance with claim 8, wherein said first current mirror comprises:

a third bipolar transistor having a collector and a base, each of which is connected to a source of said first MOS transistor, and an emitter connected to said ground voltage level; and a fourth bipolar transistor having a base connected to said base of said third bipolar transistor, an emitter connected to said ground voltage level, and a collector connected to said second current mirror.

10. The multiplier in accordance with claim 9, wherein said second current mirror comprises:

a fifth bipolar transistor having a collector and a base, each of which is connected to said collector of said fourth bipolar transistor, and an emitter connected to a predetermined voltage level; and a sixth bipolar transistor having a base connected to said base of said fifth bipolar transistor, a collector connected to said third current mirror and an emitter connected to said predetermined voltage level.

11. The multiplier in accordance with claim 8, wherein said drain and gate of said first MOS transistor are said first input voltage and a fixed voltage, respectively.

12. The multiplier in accordance with claim 8, wherein said drain and gate of said second MOS transistor are said first input voltage and a second input voltage, respectively.

* * * * *